United States Patent [19]

Arai et al.

[11] Patent Number: 5,086,107
[45] Date of Patent: Feb. 4, 1992

[54] ROOM TEMPERATURE-CURABLE ORGANOPOLYSILOXANE COMPOSITION

[75] Inventors: Masatoshi Arai; Tsuneo Kimura; Yoshio Inoue, all of Gunma, Japan

[73] Assignee: Shin-Etsu Chemical Co., Ltd., Tokyo, Japan

[21] Appl. No.: 634,998

[22] Filed: Dec. 27, 1990

[30] Foreign Application Priority Data

Dec. 28, 1989 [JP] Japan .................................. 1-343431

[51] Int. Cl.$^5$ .............................................. C08K 3/26
[52] U.S. Cl. .................................. 524/424; 524/188; 524/434; 524/588
[58] Field of Search ................ 524/188, 588, 434, 424

[56] References Cited

U.S. PATENT DOCUMENTS

| | | | |
|---|---|---|---|
| 3,189,576 | 6/1965 | Sweet | 528/43 |
| 4,105,617 | 8/1978 | Clark et al. | 524/588 |
| 4,110,300 | 8/1978 | Matsushita | 524/424 |
| 4,387,177 | 6/1988 | Mine et al. | 524/588 |
| 4,720,530 | 1/1988 | Wurminghausen et al. | 524/588 |

*Primary Examiner*—Veronica P. Hoke
*Attorney, Agent, or Firm*—Millen, White & Zelano

[57] ABSTRACT

A room temperature-curable organopolysiloxane composition capable of giving a highly oil-resistant cured silicone rubber is disclosed. The composition comprises, as the essential ingredients, a hydroxy-terminated diorganopolysiloxane, an iminoxysilane compound as a crosslinking agent, an organotin compound as a catalyst and, as an oil-resistance improver, a combination of zinc carbonate and zinc hydroxide in a powdery form of which the content of zinc hydroxide is, different from conventional basic zinc carbonate, 5 to 50% by weight. By virtue of this unique ingredient, the composition is also advantageous in respect of the high storage stability.

7 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition having excellent storability before curing and capable of giving a cured silicone rubber having excellent oil resistance not to cause a decrease in the rubbery properties and adhesive bonding to the substrate surface even in contact with engine oils, gear oils and the like so as to be useful as an FIPG sealing material of automobiles.

Conventionally, oil-resistant gaskets, packings and the like shaped from cork, various kinds of organic rubbers, asbestos and the like are widely used for sealing in and around automobile engines. These oil sealing materials are disadvantageous in respect of the troublesomeness in the stock control and process control in addition to the most serious drawback that the reliability of their sealing performance is not always high enough.

Accordingly, it is a trend in recent years that the above mentioned oil-sealing materials are under replacement more and more with FIPG (formed-in-place gasket) type oil sealings by utilizing a room temperature-curable silicone rubber composition which is now high evaluated in respect of the good workability, hermetic sealability and excellent heat resistance.

It is usual that room temperature-curable organopolysiloxane compositions or silicone rubber compositions are compounded with certain inorganic powders such as zinc oxide, zinc carbonate, magnesium oxide, calcium carbonate and the like as an oil-resistance improver when they are to be used as an FIPG material. Basic zinc carbonate or zinc hydroxycarbonate is also known as an oil-resistance improver capable of preventing degradation of the rubbery properties of a cured silicone rubber when it is contacted with an engine oil, gear oil and the like but it is not so widely employed because of the relatively poor storability of the room temperature-curable organopolysiloxane composition compounded therewith.

SUMMARY OF THE INVENTION

The present invention accordingly has an object to provide a novel room temperature-curable organopolysiloxane composition capable of giving a highly oil-resistant cured silicone rubber useful as an FIPG material in and around automobile engines still without decreasing the storablility of the uncured organopolysiloxane composition.

Thus, the room temperature-curable organopolysiloxane composition of the invention is a uniform blend which comprises:

(a) 100 parts by weight of a diorganopolysiloxane having a viscosity in the range from 25 to 500,000 centistokes at 252 C., of which the molecular chain ends are blocked with silanolic hydroxy groups;

(b) from 1 to 50 parts by weight of an iminoxysilane compound represented by the general formula $$R^1_{4-n}Si(O-N=CR^2_2)_n, \quad \text{(Ia)}$$

or $$R^1_{4-n}Si(O-N=CR^3)_n, \quad \text{(Ib)}$$

in which $R^1$ is an unsubstituted or substituted monovalent hydrocarbon group, $R^2$ is a hydrogen atom or an unsubstituted or substituted monovalent hydrocarbon group, $R^3$ is an unsubstituted or substituted divalent hydrocarbon group forming a cyclic structure together with the carbon atom bonded to the nitrogen atom and the subscript n is 3 or 4, or a partial hydrolysis product thereof;

(c) from 0.01 to 10 parts by weight of an organotin compound; and (d) from 1 to 500 parts by weight of a combination of zinc carbonate and zinc hydroxide in a powdery form of which the content of zinc hydroxide is in the range from 5 to 50% by weight.

DETAILED DESCRIPTION OF THE PREFERRED EMBODIMENTS

The above described formulation of the inventive room temperature-curable organopolysiloxane composition has been established as a result of the extensive investigations undertaken by the inventors of the reasons for the undesirably decreased storage stability of room temperature-curable silicone rubber compositions used, in particular, as an FIPG sealing material in automobiles when the composition is admixed with basic zinc carbonate powder as an oil-resistance improver. According to the result of the investigations, the basic zinc carbonate products available on the market more or less contain zinc hydroxide as an impurity and the storage stability of the room temperature-curable silicone rubber composition compounded with a basic zinc carbonate power depends on the content of the zinc hydroxide contained therein. Thus, the most characteristic feature of the inventive room temperature-curable organopolysiloxane composition consists in the use of a combination of zinc carbonate and zinc hydroxide in a powdery form containing a specified amount of zinc hydroxide as an oil-resistance improver. Namely, the diorganopolysiloxane as the component (a) and the iminoxy silane compound or a partial hydrolysis product thereof as the component (b) are each known as the ingredient of a room temperature curable organopolysiloxane composition. The composition is cured as a result of the condensation reaction between the silanol groups at the molecular chain ends of the diorganopolysiloxane as the component (a) and the iminoxy group in the component (b).

The hydroxy-terminated diorganopolysiloxane as the component (a) is represented by the general formula $$HO-(-SiR_2-O-)_m-H, \quad \text{(II)}$$

in which each R is, independently from the others, an unsubstituted or substituted monovalent hydrocarbon group exemplified by alkyl groups such as methyl, ethyl, propyl and butyl groups, cycloalkyl groups such as cyclohexyl group, alkenyl groups such as vinyl and allyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, 2-cyanoethyl and 3,3,3-trifluoropropyl groups. In particular, it is preferable that the hydrocarbon group denoted by R has 1 to 10 carbon atoms or, more preferably, 1 to 6 carbon atoms. The subscript m is a positive integer to give a degree of polymerization of the diorganopolysiloxane which should preferably be at least 10. In particular, the subscript m should have such a value that the diorganopolysiloxane has a viscosity in the range from 25 to 500,000 centistokes or, preferably, in the range from 1,000 to 1000,000 centistokes at 25° C. in order that the composition may have good workability and gives a cured silicone rubber having good rubbery properties.

The component (b) is an iminoxy-containing organosilane compound or a partial hydrolysis product thereof which serves as a crosslinking agent of the hydroxy-terminated diorganopolysiloxane as the component (a). The iminoxy-containing silane compound is represented by the above given general formula (Ia) or (Ib). In these formulas, the symbol $R^1$ denotes an unsubstituted or substituted monovalent hydrocarbon group exemplified by the same particular groups given as the examples of the group R in the general formula (II). In particular, it is preferable that the hydrocarbon group denoted by $R^1$ has 1 to 10 carbon atoms or, more preferably, 1 to 6 carbon atoms. The groups denoted by $R^2$ are, each independently from the others, a hydrogen atoms or an unsubstituted or substituted monovalent hydrocarbon group exemplified by the same groups as for the group $R^1$. In particular, it is preferable that the hydrocarbon group denoted by $R^2$ has 1 to 8 carbon atoms or, more preferably, 1 to 6 carbon atoms. The group denoted by $R^3$ in the general formula (Ib) is a divalent hydrocarbon group or, in particular, alkylene group having 8 or less of carbon atoms such as ethylene, propylene, butylene, pentamethylene and hexamethylene groups forming a cyclic structure together with the carbon atom bonded to the nitrogen atom.

Particular examples of the iminoxy-containing organosilane compound suitable as the component (b) include methyl tri(butanoxime) silane, vinyl tri(butanoxime) silane, phenyl tri(butanoxime) silane, propyl tri(butanoxime) silane, 3-chloropropyl tri(butanoxime) silane, methyl tri(isopentanoxime) silane, vinyl tri(cyclohexanoxime) silane, vinyl tri(cyclopentanoxime) silane, methyl tri(cyclohexanoxime) silane and the like.

These iminoxy silane compounds can be readily prepared by the dehydrohalogenation reaction between a halogenosilane and a corresponding oxime compound in the presence of an acid acceptor which is an amine compound such as triethyl amine, dimethyl aniline and the like or metallic sodium.

The amount of the component (b), i.e. The above described iminoxy silane compound or a partial hydrolysis product thereof, in the inventive composition is in the range from 1 to 50 parts by weight or, preferably, from 1 to 30 parts by weight per 100 parts by weight of the diorganopolysiloxane as the component (a). When the amount of the component (b) is too small, the composition may be subject to eventual gelation in the course of preparation or during storage or the cured silicone rubber obtained from the composition would be poor in various properties. When the amount of the component (b) is too large, on the other hand, shrinkage of the composition by curing would be unduly increased or the cured silicone rubber of the composition would have decreased rubbery elasticity.

The component (c) in the inventive room temperature-curable organopolysiloxane composition is an organotin compound which serves as a catalyst to promote the curing reaction of the composition. Suitable organotin compounds include alkyltin ester compounds such as dibutyl tin acetate, dibutyl tin dilaurate, dibutyl tin dioctoate and the like, halogen-containing organic tin compounds such as acetylacetonato complex of tin dibromide, tin orthoester compounds and the like, of which alkyl tin ester compounds are preferred in respect of the reactivity and easiness in handling. The amount of the organotin compound as the component (c) in the inventive composition is in the range from 0.01 to 10 parts by weight or, preferably, from 0.1 to 1 part by weight per 100 parts by weight of the diorganopolysiloxane as the component (a). When the amount of the component (c) is too small, a tack-free surface film of the composition can be formed taking an unduly long time when the composition is exposed to an atmospheric air containing moisture and curing of the composition in the core portion of a thick body would be retarded and incomplete even by prolonged exposure to air. When the amount of the component (c) is too large, on the other hand, the time taken for formation of a surface film would be extremely short to be a few seconds or even shorter to cause a great inconvenience in handling of the composition in addition to a decrease in the heat resistance of the cured silicone rubber obtained from the composition.

The component (d) comprised in the inventive organopolysiloxane composition is a combination of zinc carbonate and zinc hydroxide in a powdery form which serves to enhance the resistance of the cured silicone rubber of the composition against oils such as engine oils, gear oils and the like used in automobiles. This performance of the zinc-based inorganic filler is significantly influenced by the content of zinc hydroxide therein as a constituent thereof. Namely, the content of zinc hydroxide in the zinc-based inorganic filler as the component (d) should be in the range from 5 to 50% by weight or, preferably, from 10 to 30% by weight. When the content of zinc hydroxide is too high, the organopolysiloxane composition compounded with such a highly basic zinc-based filler would have extremely poor storage stability. When the content of zinc hydroxide is too low, on the other hand, the cured silicone rubber of the composition compounded with such a zinc-based inorganic filler would have poor resistance against oils such as engine oils and gear oils. The amount of the component (d) in the inventive organopolysiloxane composition is in the range from 1 to 500 parts by weight or, preferably, from 5 to 100 parts by weight per 100 parts by weight of the diorganopolysiloxane as the component (a). When the amount of the component (d) is too small, the desired effect of enhancement of the oil resistance of the cured silicone rubber thereby cannot be obtained as a matter of course. When the amount of the component (d) is too large, the composition can no longer give a cured silicone rubber having rubbery elasticity.

The room temperature-curable organopolysiloxane composition of the present invention can be prepared by uniformly blending the above described components (a), (b), (c) and (d) each in a specified amount in a dry atmosphere. The thus prepared composition is stable under a hermetically sealed condition so that it can be stored and supplied to the users in one package. When the composition is exposed to atmospheric air containing moisture, the crosslinking reaction proceeds between the components (a) and (b) as promoted by the catalytic activity of the component (c) so that the composition is converted into a rubbery elastomer.

It is of course optional according to need that the inventive composition is further admixed with various kinds of known additives conventionally used in silicon rubber compositions each in a limited amount. Examples of optional additives include oil-resistance improvers such as zinc oxide, magnesium oxide, calcium carbonate and the like, reinforcing and non-reinforcing fillers such as fumed and precipitated silica fillers, titanium dioxide, aluminum oxide, quartz powder, talc, bentonite and the like, fibrous fillers such as asbestos, glass fibers, organic fibers and the like, oil-resistance improvers such as potassium methacrylate and the like, coloring agents, i.e. pigments and dyes, heat-resistance improvers such as iron oxide, ceric oxide and the like, cold-resistance improvers, thixotropy-imparting agents such as polyethers and the like, dehydrating agents, rust inhibitors, adhesion improvers such as 3-aminopropyl triethoxy silane and the like, improvers for oil-resistant adhesion such as resinous organopolysiloxanes consisting of monofunctional organosiloxy units and tetrafunctional siloxane units $SiO_2$ and the like, and so on.

In the following, the room temperature-curable organopolysiloxane composition of the invention is illustrated in more detail by way of examples and comparative examples, in which the term of "parts" always refers to "parts by weight" and the values of viscosity are all those obtained by the measurement at 25° C.

EXAMPLE

Four organopolysiloxane compositions, refereed to as the compositions I, II, III and IV hereinbelow, were prepared each by uniformly blending, under an anhydrous condition, 35 parts of a dimethyl polysiloxane having a viscosity of 5200 centistokes and terminated at each molecular chain end with a silanolic hydroxy group, 9.0 parts of vinyl tributanoxime silane, 0.2 part of dibutyl tin octoate, 1.0 part of 3-aminopropyl triethoxy silane, 8.0 parts of a co-hydrolysis product of trimethyl chlorosilane and silicon tetrachloride, 12 parts of a fumed silica filler and 45 parts of either one of four powdery mixtures of zinc carbonate and zinc hydroxide, of which the contents of zinc hydroxide were 57%, 27%, 12% and 0%, respectively, by weight.

Each of the compositions I to IV was shaped into a sheet of 2 mm thickness which was kept for 7 days in an atmosphere of 50% relative humidity at 20° C. so that the composition was converted into a cured silicone rubber. The thus obtained cured silicone rubber sheets had mechanical properties shown in Table 1 below. Further, the rubber sheets were immersed for 240 hours in a gear oil 7.5 W-90 kept at 120 C. and then subjected to the measurement of the mechanical properties to give the results shown in Table 1.

The adhesive bonding of the silicone rubber formed by curing the compositions I to IV to aluminum surface was examined in the following manner. Thus, two aluminum panels having a length of 100 mm, width of 25 mm and thickness of 1 mm specified in JIS H 4000 were each coated on the 10 mm long end portion with the composition I, II, III or IV and laid one on the other with the coated areas in contact with each other and the uncoated end portions extending to the opposite directions so as to adhesively bond the aluminum panels with the composition of the 25 mm by 10 mm area. Teflon-made spacers were employed in order to make a thickness of 1 mm of the adhesive layer between the aluminum panels. This assembly was kept standing for 96 hours in an atmosphere of 50% relative humidity at 20° C. with a weight of 500 g put on the upper panel above the adhesive-coated area so that the aluminum panels were firmly bonded with the cured silicone rubber as the adhesive. The thus prepared test specimens were subjected to the measurement of the shearing adhesive bonding strength either as prepared or after immersion for 240 hours at 120° C. in the same gear oil as used above. The results are shown in Table 1.

Separately, each of the compositions I to IV was kept under a hermetically sealed condition at 70° C. for 72 hours, 144 hours or 240 hours and then shaped and cured by keeping for 7 days in an atmosphere of 50% relative humidity at 20° C. into a cured silicone rubber sheet of 2 mm thickness of which the mechanical properties were measured to give the results shown in Table 1.

As is clear from the results shown in Table 1, the cured silicone rubber obtained from the composition IV had poor oil resistance to exhibit no measurable mechanical properties and adhesive bonding strength after immersion in oil at an elevated temperature. Further, the composition I had low storage stability so that the composition after storage at 70° C. for 240 hours could no longer give a cured silicone rubber sheet having measurable mechanical properties. On the other hand, the compositions II and III were highly stable in storage at an elevated temperature to give cured silicone rubber sheets having good mechanical properties and the cured silicone rubber thereof had excellent oil resistance at 120° C. in respect of both mechanical properties and adhesive bonding strength.

TABLE 1

| Composition No. | I | II | III | IV |
|---|---|---|---|---|
| As prepared | | | | |
| Hardness, JIS A | 55 | 56 | 52 | 54 |
| Tensile strength, kgf/cm² | 35 | 31 | 35 | 33 |
| Ultimate elongation, % | 250 | 270 | 360 | 270 |
| Shearing adhesion to aluminum, kgf/cm² | 15 | 14 | 12 | 10 |
| After 240 hours immersion in gear oil at 120° C. | | | | |
| Hardness, JIS A | 38 | 32 | 37 | *) |
| Tensile strength, kgf/cm² | 15 | 12 | 13 | *) |
| Ultimate elongation, % | 160 | 80 | 100 | *) |
| Shearing adhesion to aluminum, kgf/cm² | 16 | 9 | 10 | *) |
| After 72 hours storage at 70° C. | | | | |
| Hardness, JIS A | 46 | 48 | 47 | 49 |
| Tensile strength, kgf/cm² | 21 | 32 | 26 | 37 |
| Ultimate elongation, % | 150 | 210 | 260 | 270 |
| After 144 hours storage at 70° C. | | | | |
| Hardness, JIS A | 38 | 49 | 47 | 47 |
| Tensile strength, kgf/cm² | 5 | 25 | 19 | 32 |
| Ultimate elongation, % | 100 | 150 | 240 | 220 |
| After 240 hours storage at 70° C. | | | | |
| Hardness, JIS A | *) | 43 | 42 | 42 |
| Tensile strength, kgf/cm² | *) | 13 | 11 | 27 |
| Ultimate elongation, % | *) | 130 | 180 | 200 |

*) not measurable measurable

What is claimed is:

1. A room temperature-curable organopolysiloxane composition which comprises, as a blend:
   (a) 100 parts by weight of a diorganopolysiloxane having a viscosity in the range from 25 to 500,000 centistokes at 25° C., of which the molecular chain ends are blocked with silanolic hydroxy groups;
   (b) from 1 to 50 parts by weight of an iminoxysilane compound represented by the general formula $$R^1{}_{4-n}Si(O-N=CR^2{}_2)_n,$$

or

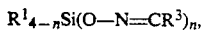

in which $R^1$ is an unsubstituted or substituted monovalent hydrocarbon group, $R^2$ is a hydrogen atom or an unsubstituted or substituted monovalent hydrocarbon group, $R^3$ is an unsubstituted or substituted divalent hydrocarbon group forming a cyclic structure together with the carbon atom bonded to the nitrogen atom and the subscript n is 3 or 4, or a partial hydrolysis product thereof; (c) from 0.01 to 10 parts by weight of an organotin compound; and (d) from 1 to 500 parts by weight of a combination of zinc carbonate and zinc hydroxide in a powdery form of which the content of zinc hydroxide is in the range from 5 to 50% by weight.

2. The room temperature-curable organopolysiloxane composition as claimed in claim 1 in which the diorganopolysiloxane has a viscosity in the range from 1000 to 100000 centistokes at 25° C.

3. The room temperature-curable organopolysiloxane composition as claimed in claim 1 in which the iminoxysilane compound as the component (b) is selected from the group consisting of methyl tri(butanoxime) silane, vinyl tri(butanoxime) silane, phenyl tri(butanoxime) silane, propyl tri(butanoxime) silane, 3-chloropropyl tri(butanoxime) silane, methyl tri(isopentanoxime) silane, vinyl tri(cyclohexanoxime) silane, vinyl tri(cyclopentanoxime) silane and methyl tri(cyclohexanoxime) silane.

4. The room temperature-curable organopolysiloxane composition as claimed in claim 1 in which the combination of zinc carbonate and zinc hydroxide and the component (d) contains from 10 to 30% by weight of zinc hydroxide.

5. The room temperature-curable organopolysiloxane composition as claimed in claim 1 in which the organotin compound is an alkyl tin ester compound.

6. The room temperature-curable organopolysiloxane composition as claimed in claim 1 in which the amount of the component (d) is in the range from 5 to 100 parts by weight per 100 parts by weight of the component (a).

7. A cured silicone rubber body obtained by curing the room temperature-curable organopolysiloxane composition according to claim 1.

* * * * *